April 29, 1952  J. C. LOCKWOOD  2,594,665
MECHANICAL CUSHIONING DEVICE
Filed March 6, 1950  2 SHEETS—SHEET 1

INVENTOR.
JACK C. LOCKWOOD
BY Frederick Diehl
ATTORNEY

April 29, 1952 — J. C. LOCKWOOD — 2,594,665
MECHANICAL CUSHIONING DEVICE
Filed March 6, 1950 — 2 SHEETS—SHEET 2
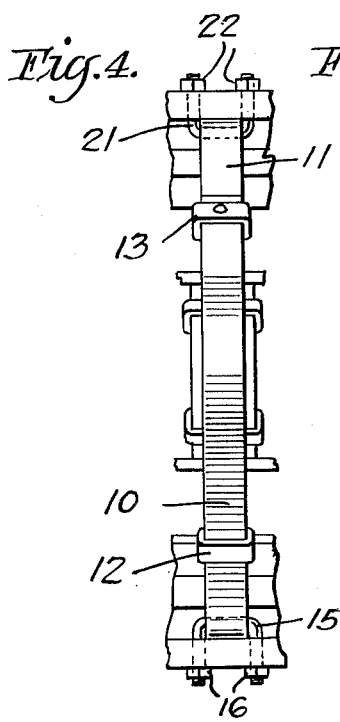
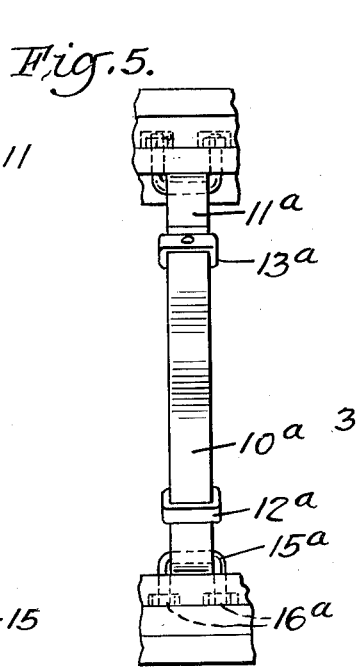
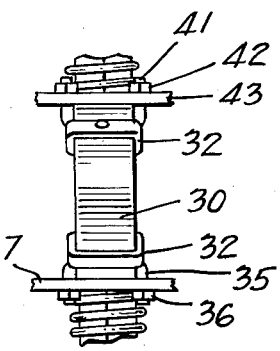
INVENTOR.
JACK C. LOCKWOOD
BY
Frederick Diehl
ATTORNEY Patented Apr. 29, 1952

2,594,665

UNITED STATES PATENT OFFICE 2,594,665

MECHANICAL CUSHIONING DEVICE

Jack C. Lockwood, Los Angeles, Calif.

Application March 6, 1950, Serial No. 147,836

10 Claims. (Cl. 267—28)

My invention relates generally to mechanisms for absorbing shocks imposed thereon from extraneous sources and in various degrees of intensity and magnitude.

An object of my invention is to provide a cushioning device which is structurally characterized in a manner to effectively absorb shocks imposed thereon, by breaking up an original shock wave into a multiplicity of minor vibrations which are transformed into a gentle rhythmic motion and are distributed throughout a great lineal distance, yet are confined within a relatively small area in proportion to the mass which is to be protected, all to the end of providing a device which is extremely compact so as to enable it to be practically utilized in a great many environments.

Another object of my invention is to provide a mechanical cushioning device of the above described character which includes a multiplicity of radially arranged spring members which are operatively connected at their ends to centrally disposed supporting elements mounted and confined to relatively rectilinear movements towards and away from each other in response to shocks on one element or the other so as to co-act with the spring members when in a condition of rest, to instantly and automatically distribute a suddenly applied major shock throughout the spring members in a manner to convert the shock into a prolonged radial cushioning action with maximum absorption of the shock.

A further object of my invention is to provide a mechanical cushioning device as above set forth wherein the radially arranged spring members are divided into at least two sections in a manner to interrupt the natural vibratory period of the members as a unit, as a shock wave is transmitted through the members from one supporting element to the other, all so as to more effectively absorb shocks as well as reduce crystallization of the members to a negligible minimum so as to prolong the utility of the members indefinitely.

With these and other objects in view, my invention resides in the combinations, arrangements and functional relationships of elements as set forth in the following specification and particularly pointed out in the appended claims.

In the accompanying drawings,

Figure 3 is a transverse sectional view taken on the line 3—3 of Figure 2;

Figure 4 is a view in front elevation, of one of the radially arranged spring members and its operative connections to the central supporting elements;

Figure 5 is a view similar to Figure 4 and illustrating another one of the radially arranged spring members and its operative connections to the central supporting elements; and Figure 6 is a view showing in front elevation, one of a number of overload spring members embodied in my invention, and illustrating the member operatively connected to other central supporting elements.

Figure 1:
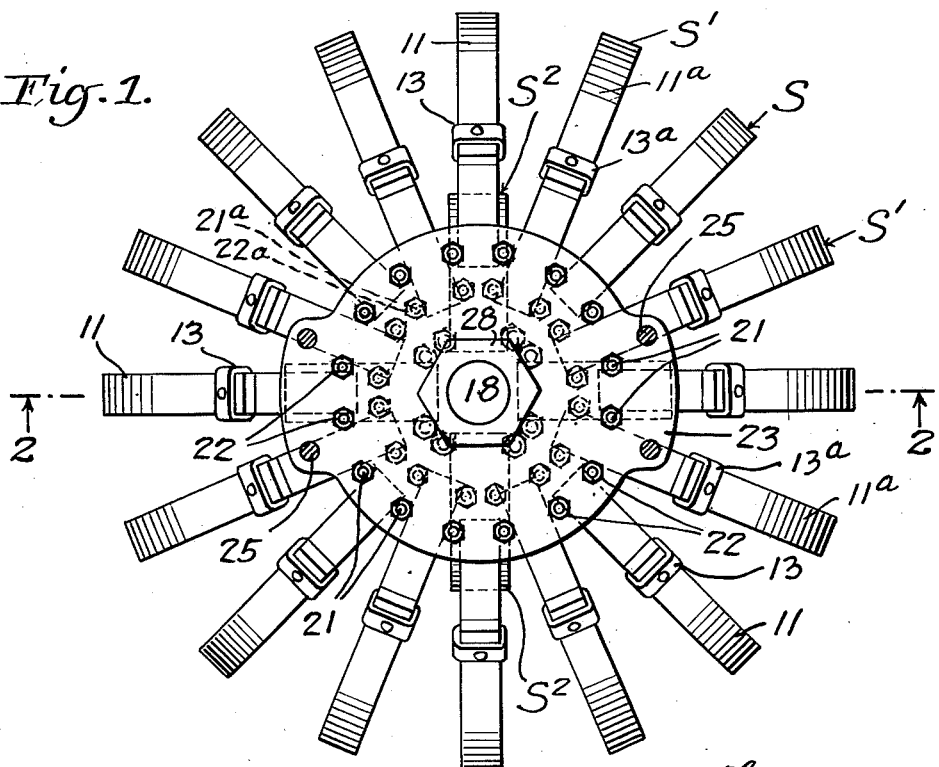
Figure 1 is a view showing in top plan, one form of mechanical cushioning device embodying my invention.

Referring specifically to the drawings, my invention in its present embodiment is shown for the purpose of illustration only, adapted for use as a shock absorber interposed between the chassis and axle of a vehicle. However, it is to be understood that the principle and arrangement of the elements of my invention are susceptible of a wide range of use in many arts, and that therefore this disclosure and claims are to be broadly construed accordingly.

In its present embodiment my invention comprises two radial series of spring members S and S' which are intended to operate in unison in absorbing shocks to a predetermined maximum intensity beyond which a third series of overload spring members S2 is automatically brought into operation to supplement the cushioning action of the members S and S'.

In the present illustration there are eight each of the spring members S and S' uniformly spaced circumferentially, with the members S' being staggered circumferentially relative to the members S in order to accommodate as many members as possible within a device of small diameter for compactness. For the purpose of illustration four of the overload spring members S2 are shown and are uniformly spaced circumferentially, all as clearly shown in Figure 3.

The members S, S' and S2 are preferably, although not necessarily, constructed of flat spring steel, and all are of generally V-shaped contour, with their apexes rounded. Each of the eight members S is constructed in at least two sections 10 and 11 overlapping at their apexes and slidably connected by clips 12 and 13, the free end of the section 10 being provided with a return bend forming a slot 14 open at one end and working on a bolt 15 having nuts 16 and rigidly secured to the flange 17 of a central supporting element in the form of a post 18 of hexagon or other noncircular cross section. In the present instance the flange 17 is intended to be fixed to an axle A of the vehicle adjacent to a wheel thereof, by bolts B. The slot 14 permits a slight inward radial movement of the respective member S, which movement is limited by engagement of the member with a stop collar 19 of yieldable, solid rubber or other suitable cushioning material mounted on the post 18.

The other end of each member S is provided with an open eye 20 receiving a U-bolt 21 having nuts 22 by which the bolt is fixed to the flange 23 of a second central supporting element in the form of a hub 24 slidably mounted on the post 18 so as to mount the hub and post for relative rectilinear movements towards and away from each other about the axis of the post. The hub 24 is fixed by bolts 25 to the chassis frame C of the vehicle, with a suitable opening or clearance space 26 being provided in the frame for axial movements of the post 18 whose upper end is externally threaded at 27 to receive a retaining nut 28 which limits the maximum expanded position of the device to that shown in Figure 2.

Each of the eight spring members S' is constructed in at least two sections 10a and 11a overlapping at their apexes and slidably connected by clips 12a and 13a, with the free outer end of the section 10a being provided with a return bend forming a slot 14a open at one end and working on a U-bolt 15a having nuts 16a and rigidly secured to a metallic collar 17a constituting a central supporting element mounted on the post 18. The slot 14a permits a slight inward radial movement of the respective member S', which movement is limited by engagement of the member with a stop collar 19a of yieldable, solid rubber or other suitable cushioning material also mounted on the post 18.

Figure 2:
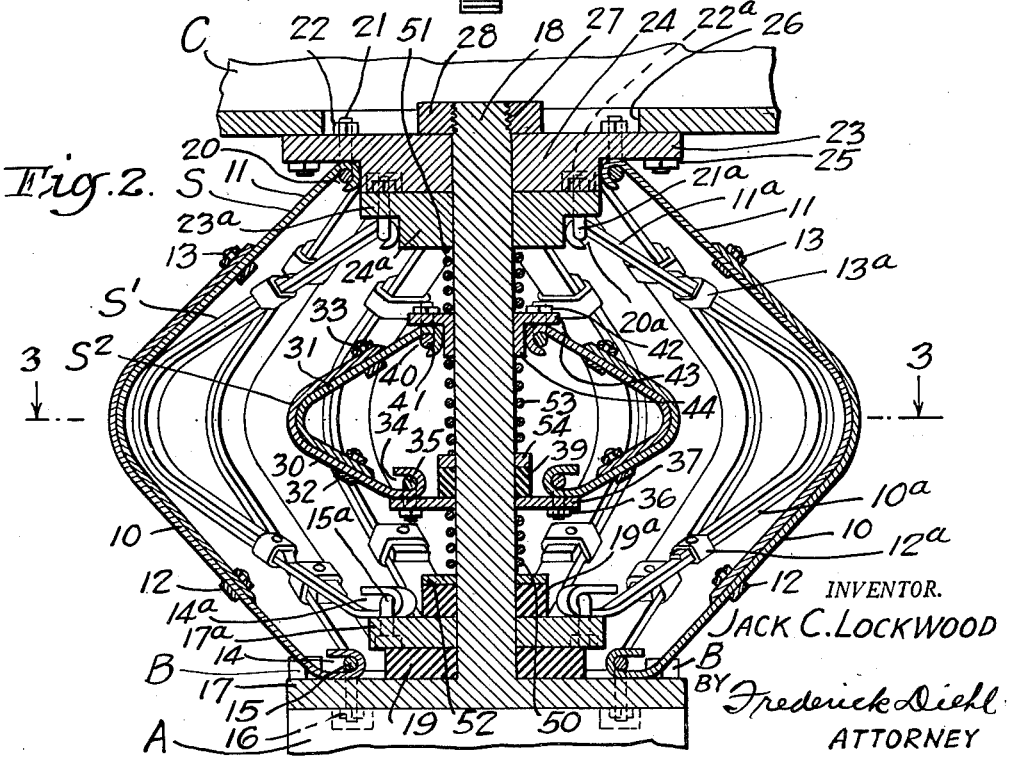
Figure 2 is an axial sectional view taken on the line 2—2 of Figure 1.

The other end of each member S" is provided with an open eye 20a receiving a U-bolt 21a having nuts 22a by which the bolt is fixed to the flange 23a of another central supporting element in the form of a second hub 24a slidably mounted on the post 18 to abut the hub 24, all as clearly shown in Figure 2.

Each of the four overload spring members S2 is constructed in at least two sections 30 and 31 overlapping at their apexes and slidably connected by clips 32 and 33, with the free outer end of the section 30 being provided with a return bend forming a slot 34 open at one end and working on a U-bolt 35 having nuts 36 and rigidly secured to a collar 37 forming another central supporting element which is slidably mounted on the post 18. The slot 34 permits a slight inward radial movement of the respective member S2, which movement is limited by engagement of the member with a stop collar 39 of yieldable, solid rubber or other suitable cushioning material mounted on the post 18 and abutting the collar 37.

The other end of each member S2 is provided with an open eye 40 receiving a U-bolt 41 having nuts 42 by which the bolt is fixed to the flange 43 of another central supporting element in the form of a hub 44 slidably mounted on the post 18.

Centering springs 50 and 51 of the coil type are mounted on the post 18 to abut the outer sides of the collar 37 and hub 44, respectively, for co-action with the hub 24a and with a metallic bearing plate 52 on the collar 19a, so as to maintain the overload spring members S2 centered axially as a unit within the two series of spring members S and S'. In addition, an overload coil spring 53 is mounted on the post 18 to engage the hub 44 and a metallic bearing plate 54 on the collar 39, so as to augment the action of the overload spring members S2 in the operation of the invention which is as follows:

When the device is subjected to a major shock such as would result from a wheel of the axle A striking a bump in the road, the members S and S' will be flexed uniformly about their apex portions as fulcrums so as to break up the initial sudden shock into a multiplicity of minor vibrations which are distributed radially along the lengths of the members S and S' from the axle to the chassis C, thus effectively absorbing the original shock by transforming same into a prolonged radial cushioning action which is in part due to the delayed and gently retarded rebounding action of the device.

As each of the members S, S' and S2 is composed of two slidably connected sections with their apexes overlapping, the periodicity of the vibrations is interrupted as the shock wave is transmitted from one section to the other through the connecting clips, crystallization of the members is reduced to a minimum.

Should the initial shock be excessive, the springs 50 and 51 will be compressed sufficiently to bring the overload spring members S2 into action. Under such circumstances the final absorption of the original shock will be effected by the flexing of the relatively stiffer spring members S2, augmented by the compression of the coil spring 53, so as to insure that the initial shock, however severe, will be absorbed before reaching the chassis C.

By the provision of the slots 14, 14a and 34, flexing of the two sections of the respective spring members S, S' and S2 as a result of shocks transmitted thereto, is rendered more uniform and is caused to take place mostly at or adjacent to the fulcrum-forming apexes of the members, it being understood that by the provision of these slots, the sections 10, 10a and 30 of the respective members are free to initially move a limited amount radially inward rather than to bow the straight portions of the other sections 11, 11a and 31 of the members when transmitting the shock thereto.

If desired, the ends of the centering springs 50, 51 and overload spring 53 may be permanently secured to the central supporting elements which the springs respectively abut, so as to obtain additional retarding action in checking rebounding movement of the series of spring members S, S' and S2.

I claim:

1. A mechanical cushioning device of the class described comprising: a plurality of supporting elements; means mounting said elements coaxially for rectilinear movements towards and away from each other; a multiplicity of spring cushioning members of generally V-shaped outline having flexible fulcrum-forming apexes; means operatively connecting the free end portions of said members to said elements, with said members radially disposed in circumferentially spaced relation for co-action in distributing among them in radially traveling waves from one of said elements to the other, shocks imposed on either element, by flexing of said members at said fulcrum-forming apexes; each of said members being composed of sections overlapping at said apexes; and means operatively connecting the overlapped portions of said sections against relative lateral displacement.

2. A mechanical cushioning device of the class described comprising: a plurality of supporting elements; means mounting said elements coaxially for rectilinear movements towards and away from each other; a multiplicity of spring cushioning members of generally V-shaped outline having flexible fulcrum-forming apexes; means operatively connecting the free end portions of said members to said elements, with said members radially disposed in circumferentially spaced relation for co-action in distributing among them in radially traveling waves from one of said elements to the other, shocks imposed on either element, by flexing of said members at said fulcrum-forming apexes; each of said members being composed of sections overlapping at said apexes; and clips connecting one section of each member to the other section thereof along the straight portions of the members.

3. A mechanical cushioning device of the class described comprising: a plurality of supporting elements; means mounting said elements coaxially for rectilinear movements towards and away from each other; a multiplicity of spring cushioning members of generally V-shaped outline having flexible fulcrum-forming apexes; means operatively connecting the free end portions of said members to said elements, with said members radially disposed in circumferentially spaced relation for co-action in distributing among them in radially traveling waves from one of said elements to the other, shocks imposed on either element, by flexing of said members at said fulcrum-forming apexes; each of said members being composed of sections overlapping at said apexes; and means operatively connecting the overlapped portions of said sections against relative lateral displacement; said operative connecting means at one end of each of said members rendering the member free for a limited movement radially relative to the respective supporting element in response to movement of the elements relatively towards each other, so as to confine flexing of the members mainly to the apex portions thereof.

4. A mechanical cushioning device of the class described comprising: a plurality of supporting elements; means mounting said elements coaxially for rectilinear movements towards and away from each other; a multiplicity of spring cushioning members of generally V-shaped outline having flexible fulcrum-forming apexes; and means operatively connecting the free end portions of said members to said elements, with said members radially disposed in circumferentially spaced relation for co-action in distributing among them in radially traveling waves from one of said elements to the other, shocks imposed on either element, by flexing of said members at said fulcrum-forming apexes; each of said members being composed of slidably connected sections overlapping at said apexes so as to interrupt the periodicity of vibration of a shock wave as same is transferred from one section to the other, whereby to more completely absorb a shock before it reaches the other of said supporting elements.

5. A mechanical cushioning device of the class described comprising: a plurality of supporting elements; means mounting said elements coaxially for rectilinear movements towards and away from each other; a multiplicity of spring cushioning members of generally V-shaped outline having flexible fulcrum-forming apexes; means operatively connecting the free end portions of said members to said elements, with said members radially disposed in circumferentially spaced relation for co-action in distributing among them in radially traveling waves from one of said elements to the other, shocks imposed on either element, by flexing of said members at said fulcrum-forming apexes; other supporting elements on said mounting means between the first said elements; overload spring cushioning members of generally V-shaped outline having flexible fulcrum-forming apexes; means operatively connecting the free end portions of said overload members to said other supporting elements with the overload members radially disposed in circumferentially spaced relation; and spring means interposed between the first and second said supporting elements for maintaining said overload members centered axially as a unit within the first said members.

6. A mechanical cushioning device of the class described comprising: a pair of supporting elements, one of which is provided with a post on which the other element is mounted for rectilinear movements of the elements relatively towards and away from each other; a circular series of spring cushioning members; and means connecting the end portions of said members to said elements to mount the members on the elements with the members radiating from the elements and circumferentially spaced for co-action in distributing shocks imposed on either supporting element, among said members in radially traveling waves from one supporting element to the other, by flexing of said members at the fulcrum-forming apexes thereof; each of said members being composed of angularly related sections slidably overlapping to interrupt the periodicity of a shock wave as same is transmitted from one section to the other, whereby to more completely absorb the shock before it reaches the other of said elements.

7. A mechanical cushioning device of the class described comprising: a pair of supporting elements, one of which is provided with a post on which the other element is mounted for rectilinear movements of the elements relatively towards and away from each other; a circular series of generally V-shaped spring cushioning members; means connecting the end portions of said members to said elements to mount the members on the elements with the members radiating from the elements and circumferentially spaced for co-action in distributing shocks imposed on either supporting element, among said members in radially traveling waves from one supporting element to the other, by flexing of said members at the fulcrum-forming apexes thereof; other supporting elements mounted on said post at the confronting sides of the first said supporting elements; a second circular series of generally V-shaped spring cushioning members; and means connecting the end portions of said members of the second said series thereof to the second said supporting elements to radiate therefrom in radially spaced relation to the members of the first said series thereof for co-action with the latter in distributing shocks as aforestated.

8. A mechanical cushioning device of the class described comprising: a pair of supporting elements, one of which is provided with a post on which the other element is mounted for rectilinear movements of the elements relatively towards and away from each other; a circular series of generally V-shaped spring cushioning members; means connecting the end portions of said members to said elements to mount the members on the elements with the members radiating from the elements and circumferentially spaced for co-action in distributing shocks imposed on either supporting element, among said members in radially traveling waves from one supporting element to the other, by flexing of said members at said fulcrum-forming apexes thereof; other supporting elements mounted on said post at the confronting sides of the first said supporting elements; a second circular series of generally V-shaped spring cushioning members; means connecting the end portions of said members of the second said series thereof to the second said supporting elements to radiate therefrom in circumferentially staggered relation to the members of the first said series thereof for co-action with the latter in distributing shocks as aforestated; other supporting elements mounted on said post between the second said supporting elements; overload spring cushioning members of generally V-shaped outline having rounded apexes forming spring fulcrums; means connecting the end portions of said overload members to the last mentioned supporting elements, with the overload elements radiating therefrom; and springs on said post for maintaining said overload members centrally located axially as a unit within the first and second said series of members.

9. A mechanical cushioning device of the class described comprising: a pair of supporting elements, one of which is provided with a post on which the other element is mounted for rectilinear movements of the elements relatively towards and away from each other; a circular series of generally V-shaped spring cushioning members; means connecting the end portions of said members to said elements to mount the members on the elements with the members radiating from the elements and circumferentially spaced for co-action in distributing shocks imposed on either supporting element, among said members in radially traveling waves from one supporting element to the other, by flexing of said members at said fulcrum-forming apexes thereof; said connecting means at one end of each of said members rendering the member free for a limited movement radially inward in response to movement of said supporting elements relatively towards each other; and a yieldable stop mounted on said post against which said one end of each of said members is adapted to abut.

10. A mechanical cushioning device of the class described comprising: two supporting elements; means mounting said elements in spaced co-axial relation for relative movements towards and away from each other; and resilient leaf spring members having their ends connected to said elements to flexibly connect them, with said members radiating from said elements in a circular series for co-action in distributing a shock imposed on either of said elements, among said members; each of said members being composed of slidably connected sections overlapping longitudinally so as to interrupt the periodicity of vibration of a shock wave as same is transferred from one section to the other, whereby to more completely absorb a shock before it reaches the other of said supporting elements.

JACK C. LOCKWOOD.

REFERENCES CITED

The following references are of record in the file of this patent:

UNITED STATES PATENTS

| Number | Name | Date |
|---|---|---|
| 33,277 | Bridges | Sept. 10, 1861 |
| 1,156,859 | Hamilton | Oct. 12, 1915 |

FOREIGN PATENTS

| Number | Country | Date |
|---|---|---|
| 472,251 | Great Britain | Sept. 15, 1937 |
| 566,933 | Great Britain | Jan. 19, 1945 |
| 547,783 | Germany | Apr. 6, 1932 |